March 12, 1968 G. R. ECKARD 3,373,333
VOLTAGE AND CURRENT REGULATOR FOR AUTOMOBILES
Filed Oct. 20, 1965 3 Sheets-Sheet 1

INVENTOR.
GARY R. ECKARD
BY
Jerome R. Cox
ATTORNEY

INVENTOR.
GARY R. ECKARD
ATTORNEY

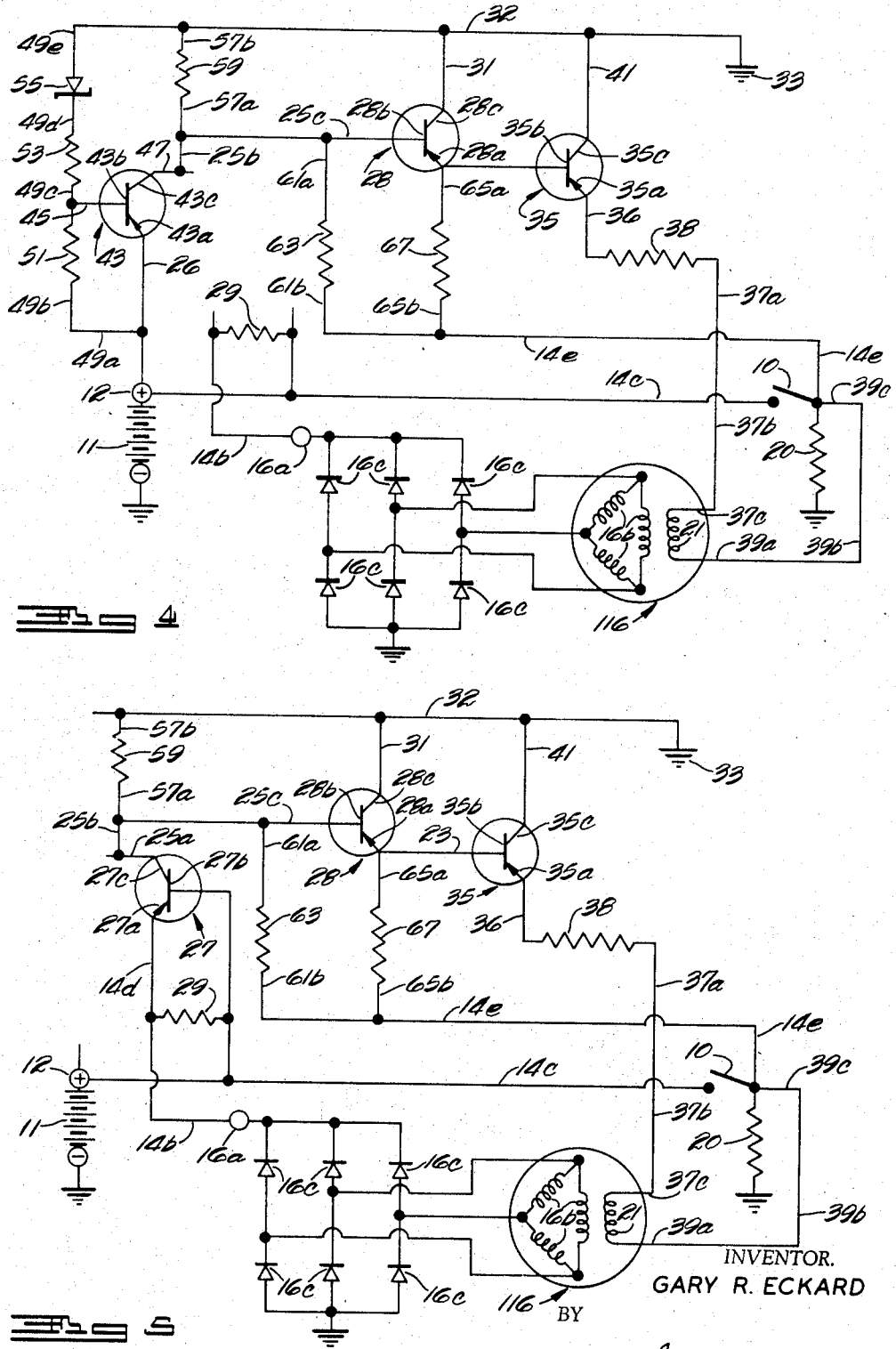

United States Patent Office 3,373,333
Patented Mar. 12, 1968

3,373,333
VOLTAGE AND CURRENT REGULATOR FOR AUTOMOBILES
Gary R. Eckard, Louada Drive, Rte. 5, Newark, Ohio 43055
Filed Oct. 20, 1965, Ser. No. 498,378
12 Claims. (Cl. 320—32)

This invention relates to electrical systems for motor vehicles such as automobiles and motor powered aircraft, and more especially to voltage and current regulators for battery charging systems for such vehicles.

Much effort has been exerted in devising systems for charging the batteries of automobiles. These charging systems should accomplish several distinct ends. They should keep the battery charged so that it can be said to be "fully charged" at all times. They should never charge the battery so that the voltage use across the terminals is greater than a definite critical voltage. They should preferably supply electric current at all times that the engine is operating sufficient to operate the several electrical current consuming mechanisms of the vehicle without drawing excessively from the battery. They should never supply electrical current to the battery nor to the current consuming mechanisms beyond the capacity of the generating device. In achieving these ends several difficulties are often encountered.

The generating device should be capable of supplying a relatively large electrical current so that the current is sufficient to operate the current consuming mechanisms at all times and so as to keep the battery "fully charged." If, in order to do this, a relatively high generating rate is provided, there is danger of overcharging the battery and there is danger of overtaxing the charging apparatus beyond its capacity and of destroying the charging apparatus with the probability of damaging the current consuming mechanisms.

Objects

One of the objects of my invention therefore is the provision of a battery charging system in a motor vehicle capable of keeping the battery charged to the desired extent without the possibility of overcharging it, and capable of supplying sufficient current to operate the several electrical current consuming mechanisms of the vehicle at all times with a provision for prevention of overcharging the battery and a provision for preventing injury either to the battery or the charging mechanism.

A further object of my invention is the provision in such a system of means for preventing the overcharging of the battery thereof (i.e., allowing the battery to have an excessively high voltage value across its terminals).

A further object of my invention is the provision of a battery charging system in a motor vehicle in which there is provided an electrical current producing device ((1) continuously driven by the engine of said vehicle when the engine is operating, and (2) connected electrically to the battery to charge it) in combination with separate devices for limiting the charging current supply whenever (1) the voltage of the battery reaches a critical value so that the battery never becomes overcharged or (2) whenever the electrical current being produced reaches an excessively high value.

Another object of my invention is the provision of such a system utilizing common electrical constituents such as transistors, diodes, and resistances as the components for controlling the charging system.

Another object of my invention is the provision of a battery charging device for a motor vehicle having an electrical current producing mechanism ((1) continuously driven by the engine of said vehicle and (2) connected electrically to current consuming devices and to the battery to normally continuously charge the battery) in combination with means comprising transistors for providing a current to the field winding of the current producing device, means comprising a transistor controlled solely by the voltage across the battery terminals for at times limiting the operation of the electrical current producing device, and means comprising a transistor controlled solely by the amount of current being produced by said current producing mechanism for also limiting the operation of the electrical current producing device.

A feature of my invention is the provision of a battery charging system which is adaptable either to an alternator rectifier charging mechanism or to a standard DC generator charging system.

A further feature of my invention is the provision of emitter follower amplifiers for amplifying the current supplied to the field winding.

A further feature of my invention is the provision of separate wiring from the battery to the voltage sensing device.

A further feature of my invention is the selection of components (resistances, diodes, and transistors) so that the temperatures encountered will not affect the operation of the device throughout an extreme range as, for example, from a −70° to 180° F., it being remembered that temperature changes have been problems with transistor devices of this kind for a long time.

Further objects and features of the invention will be apparent from the following description, reference being had to the accompanying drawings wherein a preferred embodiment of the invention is illustrated, and also to the claims following the description.

FIG. 4 is a similar diagram showing the effective parts of the system when the battery voltage limiting device is effective but when the current producing rate is held within the critical range and therefore the current producing limiting device is not effective; and FIG. 5 is a similar diagram showing the effective parts of the system when the current limiting device is effective but the battery voltage limiting device is not effective.

Detailed description

Figure 1:
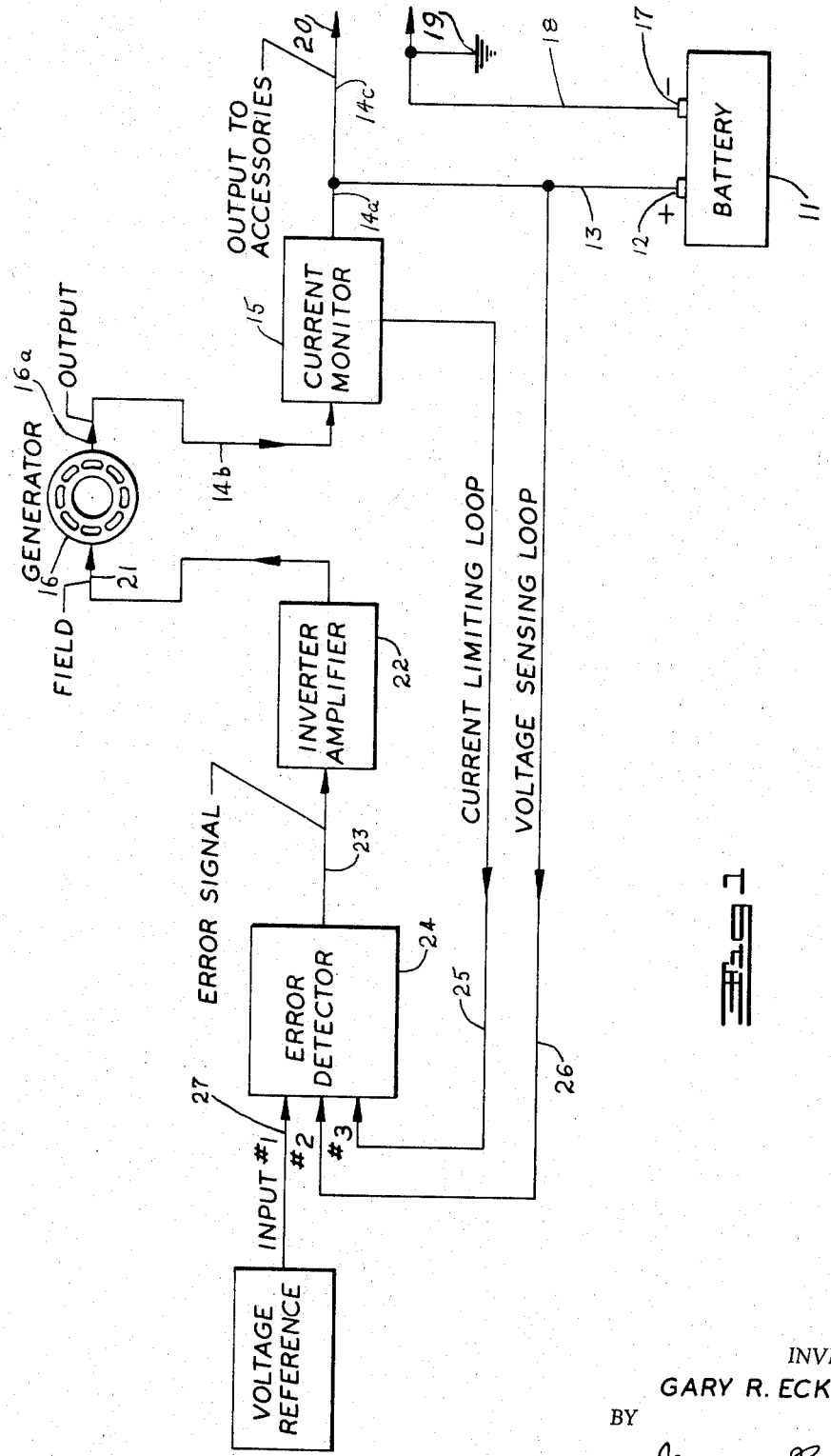
FIG. 1 is a block diagram showing the general idea of my invention.

Referring now to the individual drawings for a more detailed description of the embodiment of my invention and especially to FIG. 1, it will be seen that I have indicated a battery 11 having its positive terminal 12 connected to wiring 13 and through wiring 14a to the current monitor 15 and through wiring 14b to the output 16a of the generator 16. The negative terminal of the battery is connected through wiring 18 to the ground 19.

The output or current generated by the generator 16 is controlled by the amplitude of the field 21 which is in turn controlled by the inverter amplifier 22. The amplifier 22 is controlled through wiring 23 by an error detector 24, the error detector being jointly controlled from the current monitor 15 through wiring 25 and separately by the voltage differential across the terminals of the battery by a separate wiring 26. There is also an input through wiring 27 from a voltage reference to the error detector.

Operation

In general, the operation of the system illustrated in FIG. 1 is as follows:

The rotor member of the generator 16 is continuously rotated by the motor of the vehicle and current is thus created in an amount depending upon the intensity of the current in the field 21 and the speed of rotation of the rotor and is normally transmitted through wiring 14b, 14a, and 14c to supply the full requirements of the accessories 20. At the same time, the current created by the generator is transmitted by means of wiring 14b, 14a and 13 to the battery 11 in order to provide a desirable charging rate. The current being produced also passes by means of wiring 14b, 14a and 13 on its way to the accessories and the battery through the current monitor 15. Should the current being produced approach the danger point which might tend to create an overload on the generator 16 and thus cause it to burn out, the current monitor 15 directs a signal through the current limiting loop 25 to the error detector 24 which in turn transmits a signal to the inverter amplifier 22 and thus reduces the field to reduce the amount of current being created. Should it happen that the output created is in excess of that required to operate the accessories, such excess will tend to overcharge the battery 11. However, should the battery 11 reach the fully charged condition and if thereafter an excessively high voltage is created across its terminals, a signal is directed through the voltage sensing loop 26 to the error detector 24 so that it may in a similar way excite the inverter amplifier to decrease the strength of the field and thus decrease the amount of current being produced.

FIGURE 2

Figure 2:
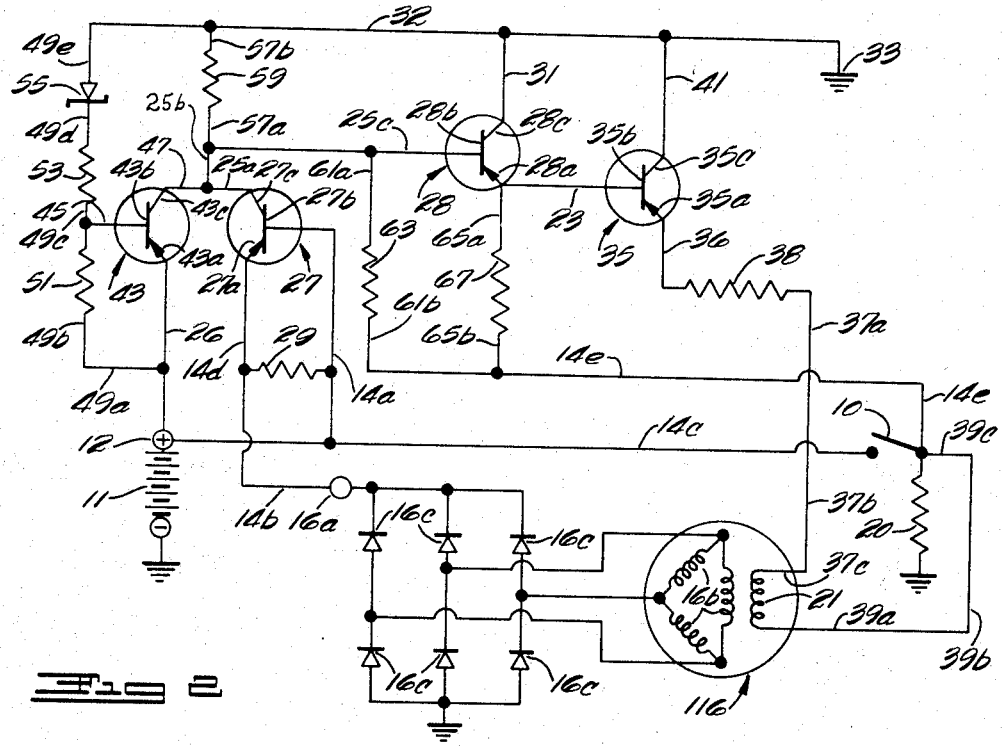
FIG. 2 is a detailed wiring diagram of a motor vehicle battery charging system designed according to my invention.

Referring to FIG. 2, it may be seen that the generator 116 which corresponds to the generator 16 of FIG. 1 is an alternator having a stator 16b and a rotating field 21. The field thus creates alternating current in the stator 16b and this is converted to direct current by rectifiers 16c. The current is directed from output 16a through wiring 14b, a 0.002 ohm resistance 29, wiring 14c, through ignition switch 10, and to the load 20 which includes the various accessories. Current also flows through wiring 14d to current monitor 15. In this instance the current monitor is a transistor 27 which is a 2N1303 transistor and corresponds to the current monitor 15 of FIG. 1. The wiring 14d is connected to the emitter 27a of the transistor 27; the base 27b of the transistor 27 is connected by wiring 14a to wiring 14c; and the collector 27c of the transistor 27 is connected through wiring 25a, 25b, and 25c to the base 28b of a transistor 28 which is a 2N599 transistor. The transistor 28 is connected through its base 28b to wiring 25c, has its collector 28c connected through a wiring 31 to wiring 32 and to ground at 33.

The transistor 28 amplifies the current supplied to it from the battery 11 in an amount determined by resistors 59, 63 and 67 which in normal operation may be an amount of about 1 milliampere. The amplified current is transmitted to the base 35b of transistor 35. For this purpose the emitter 28a of transistor 28 is connected to the base 35b of transistor 35 by wiring 23. The transistor 35 is a 2N1099 transistor. Transistors 28 and 35 form the inverter amplifier 22. Both 28 and 35 are amplifying transistors and increase the current supplied through resistor 59 from a current of the order of .001 ampere in the wiring 25c to a current in the order of 3.0 amperes in the wiring 36 which is connected to the emitter 35a. The wiring 36 leads through a 3.0 ohm resistance 38 to wiring 37a and thence through wiring 37b and wiring 37c to the field 21. The opposite end of the field 21 is connected to wiring 39a, and through wiring 39b, 39c, through the ignition switch 10, and back to wiring 14c. The collector 35c of the transistor 35 is connected through wiring 41 to wiring 32 and thus to ground 33.

The battery 11 has its positive terminal 12 also connected separately by a separate wiring 26 with the emitter 43a of transistor 43 (a 2N1303 transistor). The base 43b of transistor 43 is connected to wiring 45 and the collector 43c is connected by wiring 47 and wiring 25b. Connected to wiring 26 in parallel with transistor 43 is wiring 49 consisting of segments 49a, 49b, 49c, 49d, and 49e. Interposed between segments 49b and 49c is a 560 ohm resistance 51; interposed between wiring 49c and 49d is a 10 ohm resistance 53; and interposed between wiring 49d and 49e is a diode 55. The wiring 45 is connected to wiring segment 49c between resistances 51 and 53. The wiring segment 49e is connected to wiring 32 and thence to ground at 33. The junction of wiring segments 25b and 25c is connected by wiring 57a, a 10,000 ohm resistance 59, and wiring 57b with wiring 32 and thence to ground.

Other circuits are provided. Thus wiring segment 61a, a 33,000 ohm resistance 63, and wiring segment 61b connect wiring segment 25c with wiring segment 14e. Also, wiring segment 65a, a 100 ohm resistance 67, and wiring segment 65b connect wiring 23 with wiring segment 14e.

Operation

Figure 3:
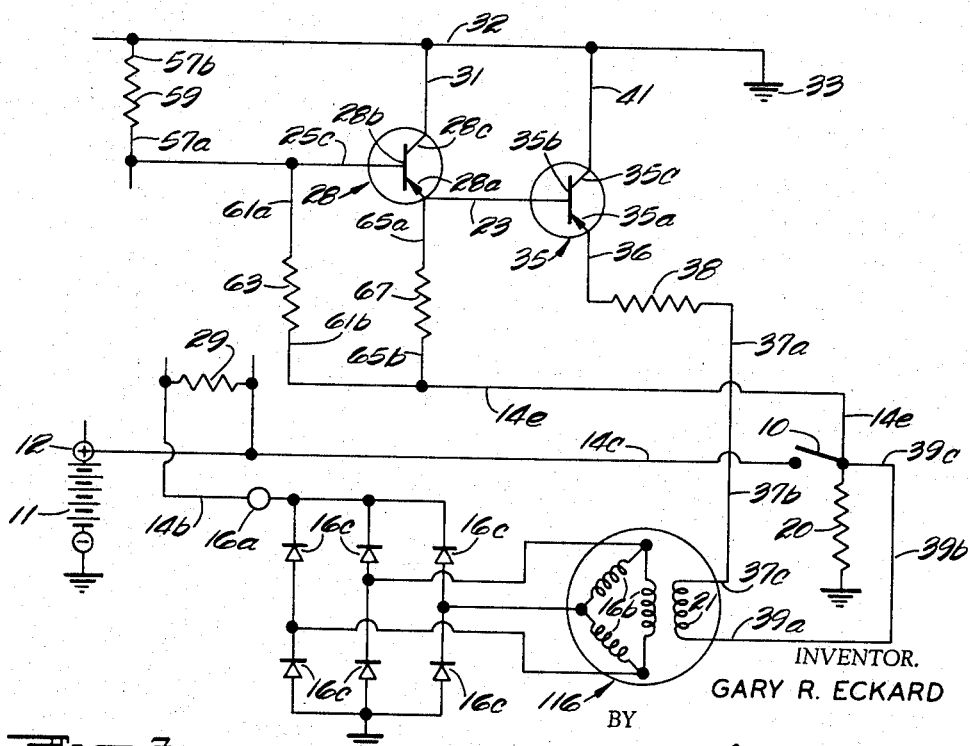
FIG. 3 is a similar diagram showing only the portions of the system which are operative when the motor of the vehicle is operating while the battery voltage and current producing rates are held within the normal critical ranges, and when therefore neither of the limiting devices for the current producing device is effective.

The components are so arranged that when the voltage across the terminals of battery 11 tends to exceed the desired value, the transistor 43 is energized and through wiring 47, 25b and 25c limits the action of transistor 28 to reduce the current flowing through the field 21 and thus reduces the current being developed by the alternator 116. This limitation is accomplished by decreasing the current supplied to the base of transistor 28. This operation may best be described in connection with FIGS. 3, 4 and 5. In FIG. 3 the vehicle is operating so that while the battery is charged to a desirable extent, it is not being overcharged, the alternator 116 corresponding to the generator 16 is operating well within its prescribed limits and current is being supplied to the accessories 20 in an acceptable manner. At such time the alternator 116 produces current which passes through the rectifiers 16c and is delivered to the output 16a as direct current. It flows through wiring 14b and 14d, resistor 29, wiring 14a and wiring 14c to the various accessories 20. The transistor 27 is not energized because the current flowing from the alternator is not excessive. The transistor 43 is not energized because there is not an excess of voltage across the terminals of the battery 11. Therefore current flows normally from the alternator output 16a by the path traced to the accessories 20. Current also flows from wiring 14c through switch 10, through wiring 14e, wiring 61b, resistance 63, wiring 61a and 25c to transistor 28, wiring 31, and wiring 32 to ground 33. It also flows normally from wiring 14e through wiring 65b, resistance 67, wiring 65a, wiring 23, through transistor 35, and then through wiring 41 and 32 to ground 33. This causes current to flow from emitter 35a to the field 21, and inasmuch as field 21 is being rotated by the motor of the vehicle, current is induced in the stator 16b of the alternator as may be required.

I will refer now to FIGURE 4. The capacity of the alternator is sufficient to operate all of the load 20 including the accessories and even has an excess capacity. As soon as the voltage is built up by this excess capacity to a point where the voltage differential across the terminals of the battery 11 approaches the critical point, the transistor 43 is partially energized with a result that the current flowing through transistor 28 is limited, and accordingly, current flowing through the transistor 35 is limited and the amount of current being produced is reduced.

I will now refer to FIGURE 5. Should it happen that the load or accessories 20 require an unusual amount of current so that the voltage differential across the terminals of the battery is decreased, the alternator 116 will endeavor to make up for this deficiency, there being at such time no limiting action by the transistor 43, and a relatively high supply of current will be supplied by the alternator 116. If this condition persists or is increased, the alternator may approach its limit with danger of burning out. In such case, the transistor 27 will be energized and regardless of the inactivity of the transistor 43, action of the transistor 28 will be limited by the transistor 27 and the current supplied to the field 21 will be limited, and the alternator 116 will be held within normal limits so that there is no danger of its destruction by its burning out, etc.

It is to be understood that the above described embodiments of my invention are for the purpose of illustration only, and while preferred embodiments are shown, various changes may be made therein without departing from the spirit and scope of the invention.

I claim:

1. A battery voltage regulating device having an electrical current producing device (1) driven by an engine and (2) connected electrically to the battery normally to continuously charge said battery, in combination with
   means comprising a transistor for controlling current through the field winding of said current producing device, means comprising a transistor controlled solely by the voltage of the battery for at times limiting the operation of the electrical current producing device and means comprising a transistor controlled solely by the current being produced by said current producing device for limiting the operation of the electrical current producing device.

2. A battery voltage regulating device constructed in accordance with claim 1 in which the means controlled by the voltage of the battery for at times limiting the operation of the electric current producing device comprises a transistor having its emitter connected to the positive terminal of the battery, its base connected through a resistance with the positive terminal of the battery and its collector connected (a) to ground through a load resistance and (b) directly to the base of the transistor for controlling current through the field winding of said current producing device.

3. The battery charging device of claim 1 in which the first and second amplifying transistors are directly coupled.

4. A battery voltage regulating device constructed in accordance with claim 1 in which the means controlled by voltage of the battery for at times limiting the operation of the electrical current producing device comprises a transistor having its emitter connected to the positive terminal of the battery, its base connected (a) through a relatively low resistance and a Zener diode with the ground and (b) through a second higher resistance with the positive terminal of the battery, and its collector connected to the ground through a load resistance, the collector being also directly connected to the base of the transistor for providing current through the field winding of said current producing device.

5. A battery voltage regulating device constructed in accordance with claim 4 in which a circuit from the positive terminal of the battery to ground through the battery controlled transistor emitter, the battery controlled transistor collector and the load resistance is in parallel with a circuit from the positive terminal of the battery through the two lower resistances and the Zener diode to the ground, the base of the battery voltage controlled transistor being connected to said second circuit intermediate said resistance.

6. A battery voltage regulating device constructed in accordance with claim 1 in which the means controlled by the current being produced for at times limiting the operation of the electrical current producing device comprises a transistor having its emitter connected to the output of the electrical current producing device, its base connected to the positive battery terminal and its collector connected (a) to the ground through a load resistance and (b) directly to the base of the transistor for controlling current through the field winding.

7. A device according to claim 1 wherein there is shunted across the battery, in series connection, the voltage controlled transistor and a load impedance, and wherein the voltage input circuit to the voltage controlled transistor comprises means shunted across said battery for achieving temperature independence, comprising a series connected Zener diode having one terminal connected to the battery and an impedance means, having the transistor input terminal connected between the Zener diode and said impedance means wherein the voltage at the input of the voltage controlled transistor equals the excess of the battery voltage over the Zener voltage of said diode.

8. A device according to claim 7, wherein the Zener breakdown voltage of said Zener diode is substantially equal to the desired battery voltage.

9. A device according to claim 7, wherein the impedance of said load impedance and said impedance means are of values selected so that the voltage controlled transistor is biased to operate approximately as a linear amplifier when the voltage at the battery exceeds a selected value.

10. A device according to claim 7, wherein a current sensing impedance is connected in series with said current producing means, and wherein said current controlled transistor has its input terminal connected to one side of said current sensing impedance, one of its output terminals connected to the other side of the current sensing impedance, and the other of its output terminals connected to an output terminal of said voltage controlled transistor.

11. A device according to claim 10, wherein the voltage controlled amplifier is biased to operate approximately as a linear amplifier when the voltage at the battery exceeds a selected value, and wherein the Zener breakdown voltage of said Zener diode is substantially equal to the desired battery voltage.

12. A battery charging device according to claim 1, comprising
   (a) a generator having a rectified output;
   (b) a storage battery;
   (c) a current sensing impedance serially connecting the generator to the battery;
   (d) a voltage sensing circuit shunted across said battery and comprising a voltage dividing series connected impedance and a Zener diode having one terminal connected to the battery and having a breakdown voltage substantially equal to the desired battery voltage;
   (e) said voltage controlled transistor and said current controlled transistor, having a common output terminal which is connected through a load impedance to a battery terminal, the voltage controlled transistor having its other output terminal connected to the battery and its input terminal connected between said Zener diode and the voltage dividing impedance, and the current controlled transistor has its other output terminal connected to one side of said current sensing impedance and its input terminal connected to the other side of said current sensing impedance, both transistors operating as linear amplifiers when in substantial conduction;
(f) an emitter follower type second amplifier stage having its input connected to said common output terminal; and
(g) an emitter follower type third amplifier stage having its input connected to the output of said second stage and having its output in series connection with said field winding.

References Cited
UNITED STATES PATENTS 3,201,681   8/1965   VanWilgen et al. _____ 322—25
3,226,623   12/1965   Krueger et al. _____ 320—39 X JOHN F. COUCH, *Primary Examiner.*

WARREN E. RAY, *Examiner.*

S. WEINBERG, *Assistant Examiner.*

UNITED STATES PATENT OFFICE

CERTIFICATE OF CORRECTION

Patent No. 3,373,333                                March 12, 1968

Gary R. Eckard

It is certified that error appears in the above identified patent and that said Letters Patent are hereby corrected as shown below:

Column 5, line 51, "electric" should read -- electrical --; line 59, the claim reference numeral "1" should read -- 2 --.

Signed and sealed this 26th day of August 1969.

(SEAL)
Attest:

Edward M. Fletcher, Jr.                      WILLIAM E. SCHUYLER, JR.
Attesting Officer                               Commissioner of Patents